US 6,621,976 B2
Sep. 16, 2003

(12) United States Patent
Han et al.

(10) Patent No.: US 6,621,976 B2
(45) Date of Patent: Sep. 16, 2003

(54) INTEGRATION OF ARRAY ON NON-ROD SHAPED OPTICAL ELEMENTS WITH ARRAY OF FIBERS IN A STRUCTURE AND ASSOCIATED METHODS

(75) Inventors: Hongtao Han, Mooresville, NC (US); Michael R. Feldman, Charlotte, NC (US)

(73) Assignee: Digital Optics Corp., Charlotte, NC (US)

( * ) Notice: Subject to any disclaimer, the term of this patent is extended or adjusted under 35 U.S.C. 154(b) by 0 days.

(21) Appl. No.: 09/893,457

(22) Filed: Jun. 29, 2001

(65) Prior Publication Data

US 2003/0133687 A1 Jul. 17, 2003

Related U.S. Application Data

(63) Continuation of application No. PCT/US00/30431, filed on Nov. 6, 2000.
(60) Provisional application No. 60/163,574, filed on Nov. 5, 1999.

(51) Int. Cl.[7] .................................................. G02B 6/00
(52) U.S. Cl. ..................................................... 385/137
(58) Field of Search ........................... 385/137, 65, 59, 385/120, 55

(56) References Cited

U.S. PATENT DOCUMENTS

| 5,241,612 A | | 8/1993 | Iwama ........................ 385/74 |
| 5,394,498 A | * | 2/1995 | Hinterlong et al. .......... 385/115 |
| 5,446,815 A | * | 8/1995 | Ota et al. ..................... 385/33 |
| 5,600,748 A | * | 2/1997 | Kosaka ........................ 385/59 |
| 6,219,484 B1 | * | 4/2001 | Rhee et al. ................. 385/137 |
| 6,328,482 B1 | * | 12/2001 | Jian ............................ 385/88 |

FOREIGN PATENT DOCUMENTS

| EP | 0 525 433 A1 | 2/1993 |
| EP | 0 619 505 A2 | 10/1994 |
| JP | 02 123301 A | 5/1990 |
| JP | 05 088046 A | 4/1993 |
| JP | 05 236216 A | 9/1993 |
| JP | 06 118283 A | 4/1994 |
| JP | 07 311320 A | 3/1996 |
| JP | 08 075950 A | 3/1996 |

OTHER PUBLICATIONS

Han H. et al., "Integration of Silicon Bench with Micro Optics", vol. 3631, pp. 234–243, XP000995170 Jan. 1999.

* cited by examiner

Primary Examiner—Khiem Nguyen
Assistant Examiner—Hae Moon Hyeon
(74) Attorney, Agent, or Firm—Susan S. Morse

(57) ABSTRACT

Arrays of non-rod shaped optical elements may be integrated with fiber arrays arranged in a positioning structure. The use of non-rod shaped optical elements allow the elements to be lithographically created already accurately aligned relative to one another. This also allows for simultaneous alignment of the array of optical elements with the array of fibers. The arrays may be one or two dimensional. The support structure for the fibers may be any desired structure. The fiber endfaces may be angled. The array of optical elements may include more than one substrate bonded together. Passive alignment features, including visual alignment marks and/or mechanical mating features, may be provided on

16 Claims, 6 Drawing Sheets

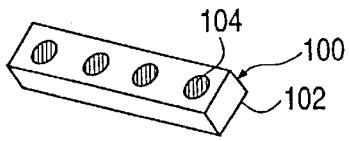
FIG. 1A
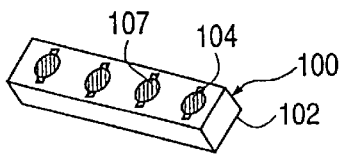
FIG. 1B
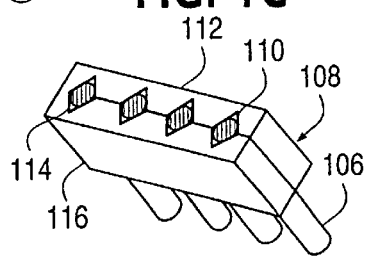
FIG. 1C
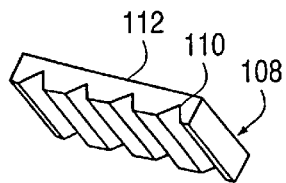
FIG. 1D
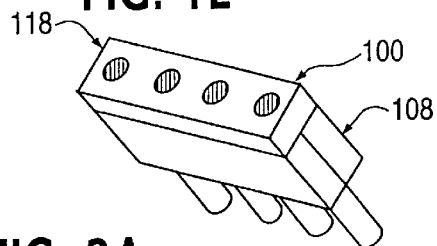
FIG. 1E
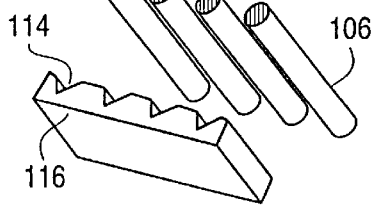
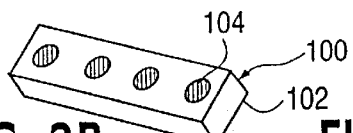
FIG. 2A
FIG. 2B
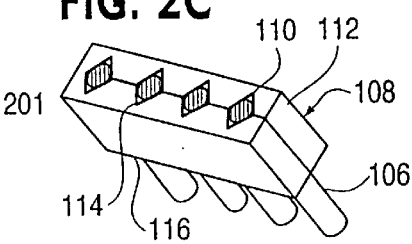
FIG. 2C
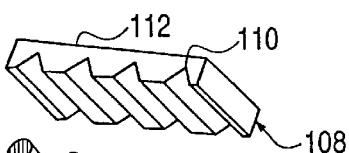
FIG. 2D
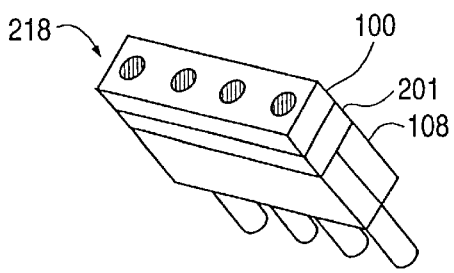
FIG. 2E
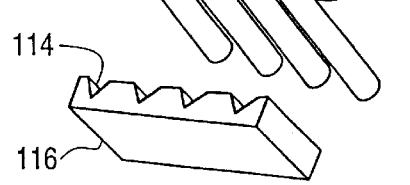

FIG. 3A
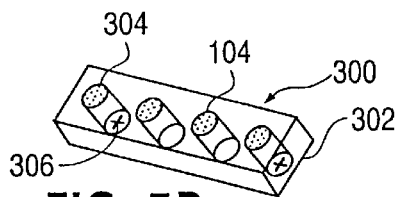
FIG. 3C
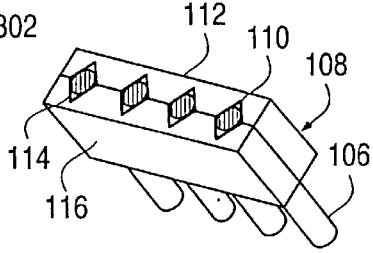
FIG. 3D
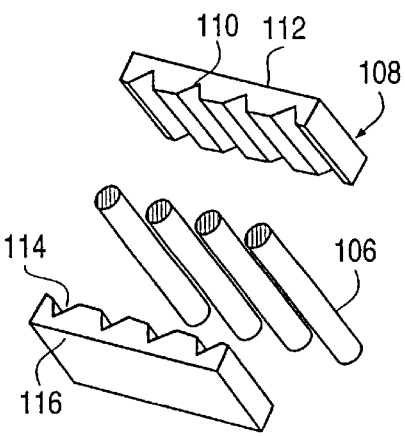
FIG. 3B
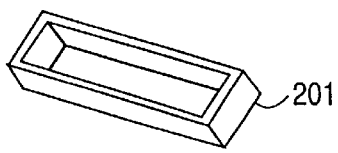
FIG. 3E
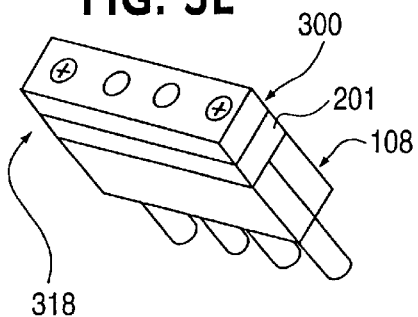
FIG. 4A
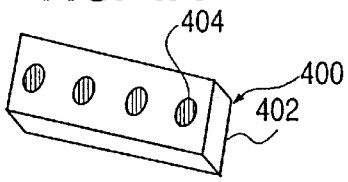
FIG. 4B
FIG. 4C
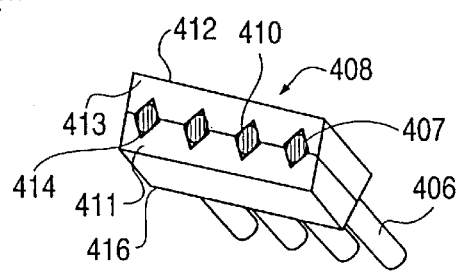
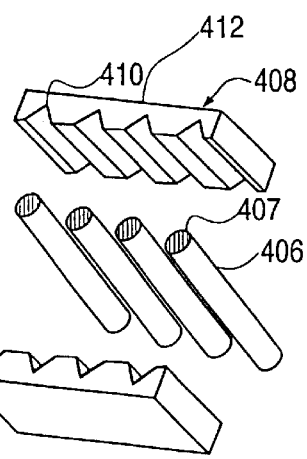
FIG. 4D
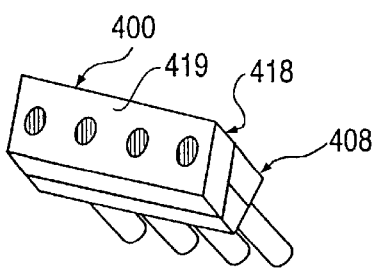

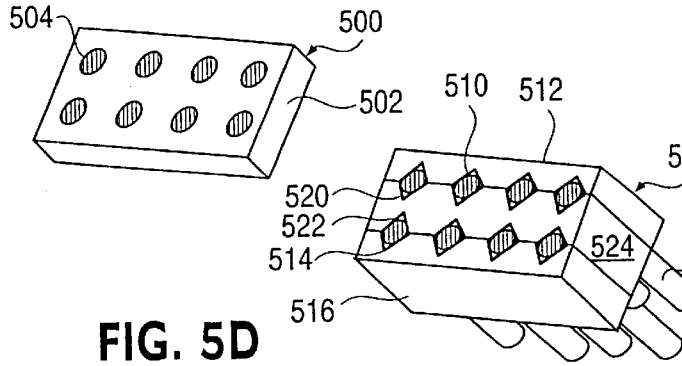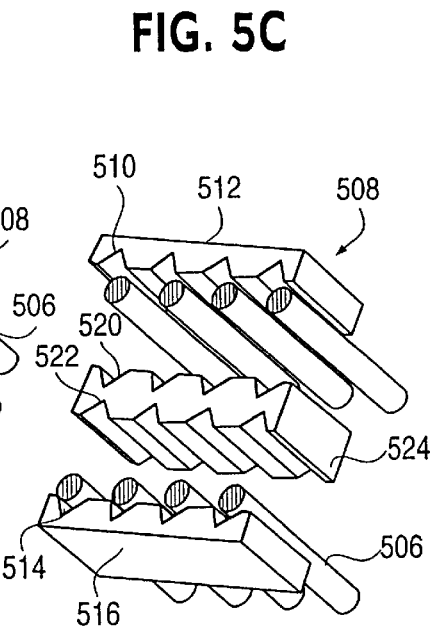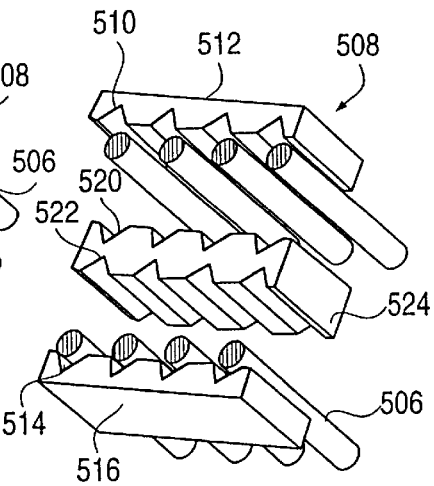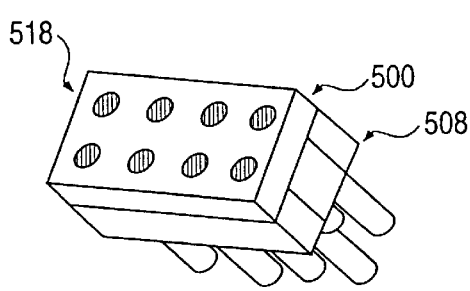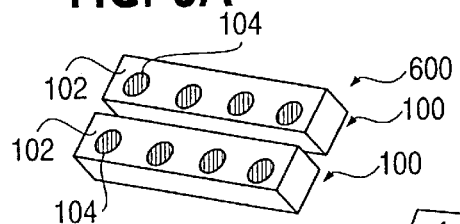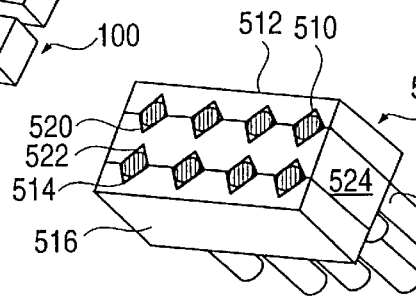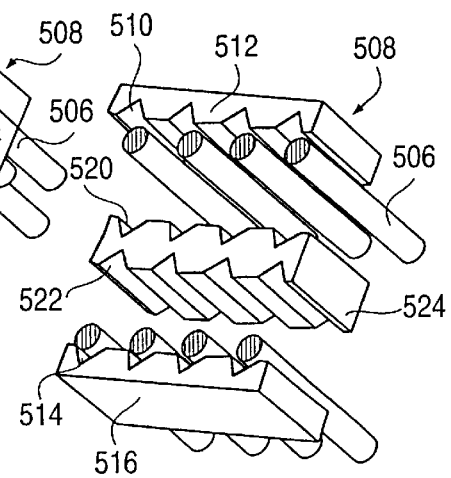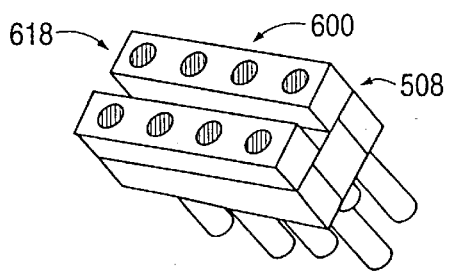

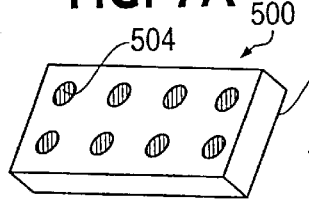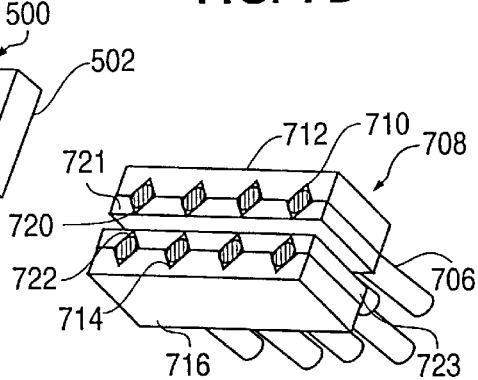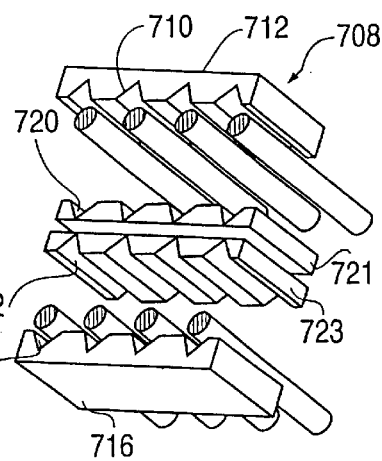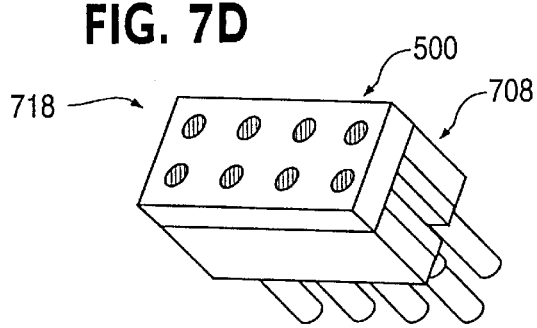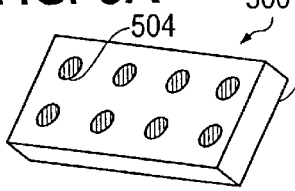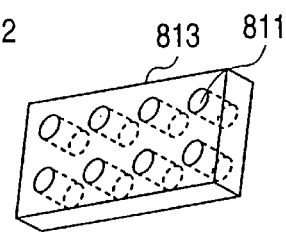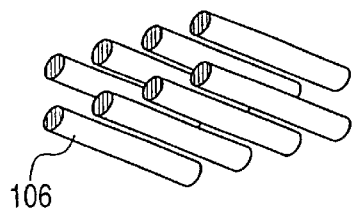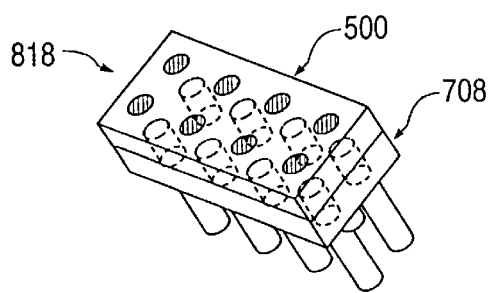

INTEGRATION OF ARRAY ON NON-ROD SHAPED OPTICAL ELEMENTS WITH ARRAY OF FIBERS IN A STRUCTURE AND ASSOCIATED METHODS

CROSS-REFERENCES TO RELATED APPLICATIONS

The present application is a continuation of Application PCT/US00/30431, filed Nov. 6, 2000 and claims benefit of U.S. Provisional Application No. 60/163,574 filed Nov. 5, 1999, the entire contents of both of which are hereby incorporated by reference for all purposes.

BACKGROUND OF THE INVENTION

1. Field of the Invention

The present invention is directed to integrating an array of non-rod shaped optical array with an array of fibers positioned in a structure and associated methods. The arrays may be arranged along one or more dimensions.

2. Description of Related Art

Numerous recent applications, such as optical switching, require precise positioning of fibers in an array. Such precise positioning is typically achieved using V-grooves in a substrate which can be accurately formed and in which the fibers are then placed to align them both vertically and horizontally with respect to one another. Typically, when using optical elements in conjunction with fibers in V-grooves, these optical elements are in the form of a rod, such as a Gradient Index (GRIN) lens. The use of such a lens allows V-grooves to also be employed to align these lenses with the fibers.

While GRIN lenses offer good performance, the individual insertion required to align each GRIN lens with a respective fiber is tedious and impractical on a large scale, especially as the industry moves toward two-dimensional arrays. While a two-dimensional bundle of optical elements other than rod-shaped elements have been used in conjunction with a two dimensional bundle of fibers for imaging applications, in which all of the fibers and optical elements are forming a single image, the alignment and positioning of the fibers is not nearly as demanding as that of the optical interconnection applications. Further, since all of the fibers are forming the same image, the fibers are arranged in a bundle as close together as possible, and would not be placed in the structure used for the accurate positioning of the fibers for optical interconnection applications.

Thus, while the provision of one and two-dimensional array of fibers accurately arranged in structures has been realized, non-rod optical elements integrated therewith have not. Such non-rod elements are typically thinner, cheaper and an entire array of these elements may be of unitary construction for simultaneous alignment.

SUMMARY OF THE INVENTION

The present invention is therefore directed to integrating an array of non-rod shaped optical elements with an array of fibers positioned in structures and associated methods which substantially overcomes one or more of the problems due to the limitations and disadvantages of the related art.

The objects of the present invention may be realized using one or two dimensional arrays. The two-dimensional arrays may be integral or deconstructed. The support structure for the fibers may be any desired structure, including V-grooves. The fiber endfaces may be angled. The optical elements may be constructed to account for the angled fiber endfaces in numerous manners. The array of optical elements may include more than one substrate bonded together. Passive alignment features, including visual alignment marks and/or mechanical mating features, may be provided on either of the arrays, although more typically on the array of optical elements.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which:

FIG. 1A is a perspective elevational view of a one-dimensional array of non-rod optical elements;

FIG. 1B is a perspective elevational view of a back side of one-dimensional array of non-rod optical elements shown in FIG. 1A;

FIG. 1C is a perspective elevational view of a one-dimensional array of fibers positioned in V-grooves;

FIG. 1D is an exploded perspective elevational view of the array of FIG. 1C;

FIG. 1E is a perspective elevational view of the integrated one-dimensional arrays of FIGS. 1A and 1C;

FIG. 2A is a perspective elevational view of a one-dimensional array of non-rod optical elements;

FIG. 2B is a perspective elevational view of a spacer;

FIG. 2C is a perspective elevational view of a one-dimensional array of fibers positioned in V-grooves;

FIG. 2D is an exploded perspective elevational view of the array of FIG. 2C;

FIG. 2E is a perspective elevational view of the integrated one-dimensional arrays of FIGS. 2A and 2C with the spacer of FIG. 2B;

FIG. 3A is a perspective elevational view of a one-dimensional array of non-rod optical elements;

FIG. 3B is a perspective elevational view of a one-dimensional array of fibers positioned in V-grooves;

FIG. 3C is an exploded perspective elevational view of the array of FIG. 3B;

FIG. 3D is a perspective elevational view of the integrated one-dimensional arrays of FIGS. 3A and 3B;

FIG. 4A is a perspective elevational view of a one-dimensional array of non-rod optical elements;

FIG. 4B is a perspective elevational view of a one-dimensional array of fibers positioned in V-grooves;

FIG. 4C is an exploded perspective elevational view of the array of FIG. 4B;

FIG. 4D is a perspective elevational view of the integrated one-dimensional arrays of FIGS. 4A and 4B;

FIG. 5A is a perspective elevational view of a two-dimensional array of non-rod optical elements;

FIG. 5B is a perspective elevational view of a two-dimensional array of fibers positioned in V-grooves;

FIG. 5C is an exploded perspective elevational view of the array of FIG. 5B;

FIG. 5D is a perspective elevational view of the integrated two-dimensional arrays of FIGS. 5A and 5B;

FIG. 6A is a perspective elevational view of two one-dimensional arrays of non-rod optical elements;

FIG. 6B is a perspective elevational view of a two-dimensional array of fibers positioned in V-grooves;

FIG. 6C is an exploded perspective elevational view of the array of FIG. 6B;

FIG. 6D is a perspective elevational view of the integrated arrays of FIGS. 6A and 6B;

FIG. 7A is a perspective elevational view of a two-dimensional array of non-rod optical elements;

FIG. 7B is a perspective elevational view of two one-dimensional arrays of fibers positioned in V-grooves;

FIG. 7C is an exploded perspective elevational view of the arrays of FIG. 7B;

FIG. 7D is a perspective elevational view of the integrated arrays of FIGS. 7A and 7B;

FIG. 8A is a perspective elevational view of a two-dimensional array of non-rod optical elements;

FIG. 8B is a perspective elevational view of two-dimensional array of holes in a substrate;

FIG. 8C is a perspective elevational view of the fibers arranged in a two-dimensional array;

FIG. 8D is a perspective elevational view of the integrated arrays of FIGS. 8A–8C;

DETAILED DESCRIPTION OF THE PREFERRED EMBODIMENTS

Figure 4E:
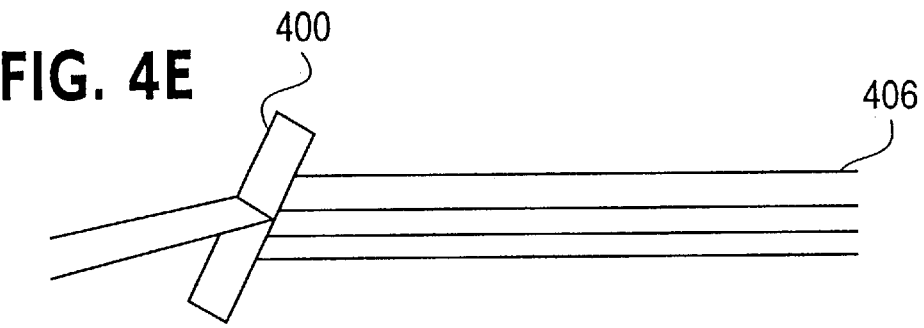
FIG. 4E is a cross-section of the interface shown in FIG. 4D.

The present invention will be described in detail through preferred embodiments with reference to accompanying drawings. However, the present invention is not limited to the following embodiments but may be implemented in various types. The preferred embodiments are only provided to make the disclosure of the invention complete and make one having an ordinary skill in the art know the scope of the invention. The thicknesses of various layers and regions are emphasized for clarity in accompanying drawings.

FIGS. 1A–1D illustrate the simplest configuration of the present invention. FIG. 1A is a one-dimensional array 100 of non-rod optical elements 104 formed on a substrate 102. This array 100 is unitary. This array 100 may be formed on a wafer level, e.g., photolithographically, and then diced to form a desired one-dimensional array. The optical elements may be refractive elements, diffractive elements, or hybrids thereof. The non-rod optical elements 104 of the array 100 do not have to be the same. The non-rod optical elements 104 may perform any desired optical function or combination thereof, such as collimating, focusing, homogenizing, etc. The non-rod optical elements 104 are spaced in accordance with the spacing in a one-dimensional array of optical fibers 106 shown in FIGS. 1C and 1D.

As can be seen in FIG. 1C and 1D, the one-dimensional array 108 of optical fibers 106 includes an array of upper V-grooves 110 in an upper substrate 112 and an array of lower V-grooves 114 in a lower substrate 116. The optical fibers 106 are placed in respective V-grooves 110, 114 which are aligned with one another. The substrates 112, 116 are then adhered to one another in a conventional manner.

The one-dimensional array 100 and the one-dimensional array 108 are aligned and adhered to form the integrated optics-fiber structure 118 as shown in FIG. 1E. The alignment may be performed actively, with light traveling through the elements, or passively. While passive alignment features may be provided on the one-dimensional array 100 of non-rod optical elements 104, since the V-grooves 110, 114 are typically formed by dicing a substrate containing longer V-grooves, such alignment features are not readily formed thereon. However, since the V-grooves 110, 114 can be so precisely formed, for example by anisotropic etching on a semiconductor substrate, such as a silicon substrate, the V-grooves 110, 114 themselves may be used as the passive alignment features for aligning the non-rod optical elements 104 and the optical fibers 106. Thus, the alignment features on the one-dimensional array 100 will be for passively aligning, either visually or mechanically, with the corresponding V-grooves 110, 114 of the one-dimensional array 108.

The visual alignment features may include optical fiducial marks, while the mechanical mating features may include protrusions 107 shown in FIG. 1B on a surface of the array 100 facing the optical fiber array, such that these protrusions 107 fit into the empty space in the v-groove 110 above and/or below the optical fiber. When the non-rod optical elements are lithographically formed, it is advantageous to create the alignment features lithographically as well. The lithographic creation of the alignment features may be with the same mask used for creation of the non-rod optical elements, or with another mask.

The configuration shown in FIGS. 2A–2E is similar to that of FIGS. 1A–1E, as indicated by the use of the same reference numerals for the same elements. Therefore, additional description of these elements will be eliminated. As shown in FIGS. 2B and 2E, the present configuration includes a spacer 201, e.g., a transparent spacer or a hollow spacer providing empty space in a region in which light is to travel between the optics and the fiber. When using a hollow spacer, the desired beam size to be realized in a shorter distance, since the light to or from the fiber will converge or diverge faster in free space than in a medium.

The configuration shown in FIGS. 3A–3E is similar to that of FIGS. 2A–2E, as indicated by the use of the same reference numerals for the same elements. Therefore, additional description of these elements will not be reiterated. As shown in FIGS. 3A and 3E, the one-dimensional array 300 in addition to the previous non-rod optical elements 104, includes optical elements 304 which are used exclusively for alignment. By providing alignment features 306 on a surface where an optical element should be, passive alignment of the one-dimensional array 300 may be realized by aligning the alignment marks 306 on the periphery of the array 300 with a corresponding optical fiber 106. The corresponding channel will not be used in the end application. Such passive alignment is particularly useful when the positioning structure for the optical fibers 106 does not include V-grooves or other features which may be used for alignment on the end face of the structure, for example, when precisely formed holes in which the optical fibers 106 are inserted are used to precisely position the optical fibers.

The configuration in FIGS. 4A–4D illustrate how the optics and fiber may be integrated when the endfaces of the fibers are at an angle. Angled endfaces help reduce back reflections, and the losses associated therewith.

As shown in FIG. 4A, the one-dimensional array 400 includes a substrate 402 having non-rod optical elements 404 therein. These optical elements 404 are refractive elements, they are no longer circular as in the other examples, but now are elliptical to match the shape of the fiber endfaces. Further, the optical elements 404 are preferably diffractive elements which compensate for the shape of the light output by the angled fiber.

As can be seen in FIGS. 4B and 4C, the one-dimensional array 408 of optical fibers 406 having angled endfaces 407 includes an array of upper V-grooves 410 in an upper substrate 412 and an array of lower V-grooves 414 in a lower substrate 416. As before, the optical fibers 406 are placed in respective V-grooves 410, 414 which are aligned with one another and the substrates 412, 416 are then adhered to one another in a conventional manner. However, the substrates 412, 416 also have angled endfaces 411, 413 in accordance with the angle of the optical fiber endfaces 407.

The one-dimensional array 400 and the one-dimensional array 408 are aligned and adhered to form an integrated optics-fiber structure 418. The alignment may be performed as discussed above. Since the one-dimensional array 400 of the elliptical optical elements 404 is still formed from a flat wafer, an endface 419 of the integrated optics-fiber structure 418 is still angled in accordance with the angle of the fiber endface 407.

A better view of the interface between the one-dimensional array 400 and the angled optical fiber 406 is seen in FIG. 4E. Since the beam coming out of the angled optical fiber endface is elliptical, the optical elements 404 are anamorphic to collimate the beam. However, since the one-dimensional array 400 is tilted, the beam is still tilted. Further, mounting the one-dimensional array 400 at an angle is more difficult than mounting it straight.

Figure 4F:
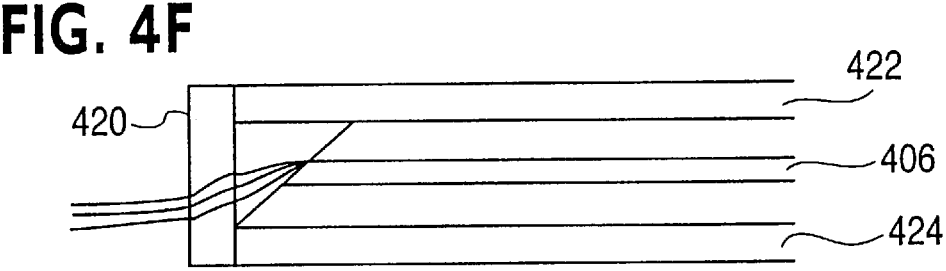
FIG. 4F is a cross-section of an alternative interface for fibers with angled endfaces.
Figure 4G:
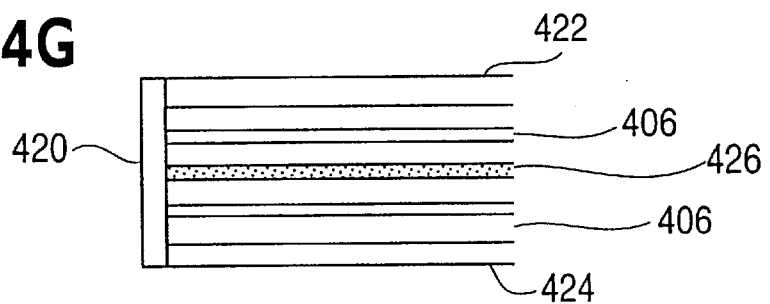
FIG. 4G is a cross-section of a two-dimensional configuration of FIG. 4F.

An alternative embodiment is shown in FIG. 4F. Here, the lens array block 420 is kept straight, while support elements 422, 424 are provided on either side of the support structure for the fiber 406, e.g., the v-groove block 408. These support elements 422, 424, serve as a mount for the optics block 400. This configuration is advantageous for two-dimensional arrays, as shown in FIG. 4G, where two fibers 406 forming a two dimensional array, with additional fibers being in the plane of the page above and below the representative fibers . The intermediate support structure between the upper and lower fibers is indicated at 426. This configuration eliminates adhesive in the optical path, but does require more parts. Further, the use of an anamorphic lens on the flat surface now removes tilt from the beam. While the angle here is exaggerated for illustration, the angle of the endface of the fiber is typically about 8°–12° perpendicular to the optical axis of the fiber.

Figure 4H:
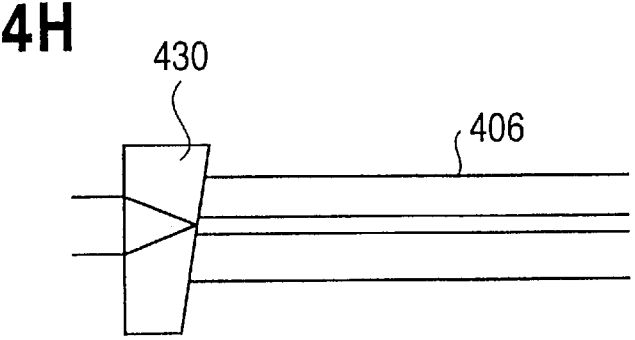
FIG. 4H is a cross-section of another alternative interface for fibers with angled endfaces.

Another configuration is shown in FIG. 4H, in which the optics block 430 has one surface thereof sloped to match the angle of the optical fiber endface, while another surface thereof is orthogonal to the optical fiber axis. Thus, the surfaces of the optics block 430 are not parallel. However, since the angle of the optical fiber endface is relatively small, the difference in distance traveled by the beam does not significantly affect the output. This configuration corrects for the tilt as well. If optical elements are only formed on the straight surface, the angle on the other surface may be, formed by polishing that surface after formation of the elements.

A configuration for two-dimensional arrays is shown in FIGS. 5A–5D. FIG. 5A is a two-dimensional array 500 of non-rod optical elements 504 formed on a substrate 502. This array 500 may be formed on a wafer level and then diced to form a desired two-dimensional array which contains at least two rows and at least two columns of optical elements. This array 500 is unitary. The array 500 may be of refractive elements, diffractive elements or-hybrids thereof. The non-rod optical elements 504 of the array 500 do not have to be the same. The non-rod optical elements 504 are spaced in accordance with the optical fiber spacing in a two-dimensional array 508 of optical fibers 506 shown in FIGS. 5B and 5C.

As can be seen in FIGS. 5B and 5C, the two-dimensional array 508 of fibers 506 includes an upper V-groove 510 in an upper substrate 512 and a lower V-groove 514 in a lower substrate 516. The two-dimensional array 508 also includes an upper middle V-groove 520 and a lower middle V-groove 522, both of which are in a middle substrate 524. An upper row of fibers 506 are placed in respective V-grooves 510, 520, and a lower row of fibers 506 are placed in respective V-grooves 514,522. All of these V-grooves 510, 514, 520, 522 are aligned with one another and the substrates 512, 516, 524 are then adhered to one another in a conventional manner. Obviously, numerous middle substrates could be provided to accommodate any desired number of rows of fibers.

The two-dimensional array 500 and the two-dimensional array 508 are aligned and adhered to form the integrated optics-fiber structure 518 as shown in FIG. 5D. The alignment may be performed as discussed above.

However, alignment of two-dimensional arrays is more difficult than alignment of one-dimensional arrays. Therefore, it is advantageous to deconstruct at least one of two into a plurality of one-dimensional arrays. As used herein, "deconstructed" is to mean each array, typically a one-dimensional array, of the deconstructed array may be aligned independently from each other.

As shown in FIGS. 6A–6D, instead of providing a two-dimensional array 500, a deconstructed two-dimensional array 600 having two one-dimensional arrays 100 of optical elements 104 is provided. The structure of the fiber array 508 is similar to that of FIGS. 5B–5C, as indicated by the use of the same reference numerals for the same elements, and has not been reiterated.

Now when aligning the two-dimensional arrays 600, 508 to form the integrated optics-fiber structure 618 shown in FIG. 6D, any deviation in the thickness of the middle substrate 524 from a desired thickness may be compensated. Further, the use of the deconstructed two-dimensional array 600 is particularly advantageous when the fibers in different rows are to be offset from one another.

As shown in FIGS. 7A–7D, instead of providing a two-dimensional array 508, a deconstructed two-dimensional array 708 having two one-dimensional arrays of fibers 706 is provided as shown in FIGS. 7B and 7C. The structure of the two-dimensional array 500 is similar to that of FIG. 5A, as indicated by the use of the same reference numerals for the same elements, and has not been reiterated.

As can be seen in FIGS. 7B and 7C, the deconstructed two-dimensional array 708 of fibers 706 includes an array of upper V-grooves 710 in an upper substrate 712 and an array of lower V-grooves 714 in a lower substrate 716. The deconstructed two-dimensional array 708 also includes an array of upper middle V-grooves 720 formed in an upper middle substrate 721 and an array of lower middle V-grooves 722 formed in a lower middle substrate 723. An upper row of fibers 706 are placed in respective V-grooves 710, 720, and a lower row of fibers 706 are placed in respective V-grooves 714,722. The V-grooves 710, 720 are aligned with one another and the substrates 712 and 721 are then adhered to one another in a conventional manner. Similarly, the V-grooves 714, 722 are aligned with one another and the substrates 716 and 723 are then adhered to one another in a conventional manner. Obviously, numerous middle substrates could be provided to accommodate any desired number of rows of fibers.

Now when aligning the two-dimensional arrays 500, 708 to form the integrated optics-fiber structure 718 shown in FIG. 7D, any deviation in the vertical separation of the optical elements 504 from a desired separation may be compensated.

The configuration shown in FIGS. 8A–8D, holes 811 in a substrate 813 are used instead of V-grooves to accurately position and house the optical fibers 106 therein to form the integrated optics-fiber structure 818 shown in FIG. 8D. Otherwise, the structure is similar to that of FIGS. 5A–5D, as indicated by the use of the same reference numerals for the same elements, and has not been reiterated. These holes may be drilled or may be formed lithographically. Of course, the substrate 813 with holes 811 could be used with any of the above configurations. When holes are used, a potential mechanical mating feature would be to provide rods extending from the array 500 for insertion into one of the holes 811 to facilitate alignment.

Figure 9A:
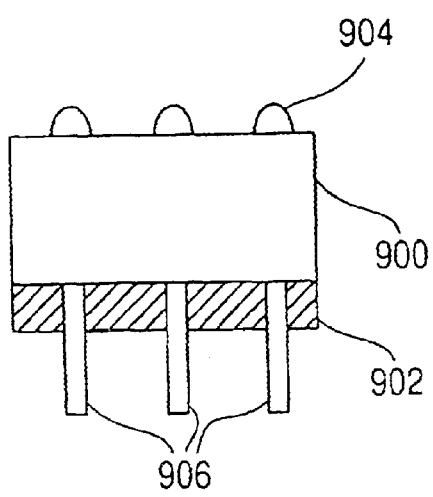
FIG. 9A is a cross-section of an alternative to using v-grooves in accordance with the present invention.
Figure 9B:
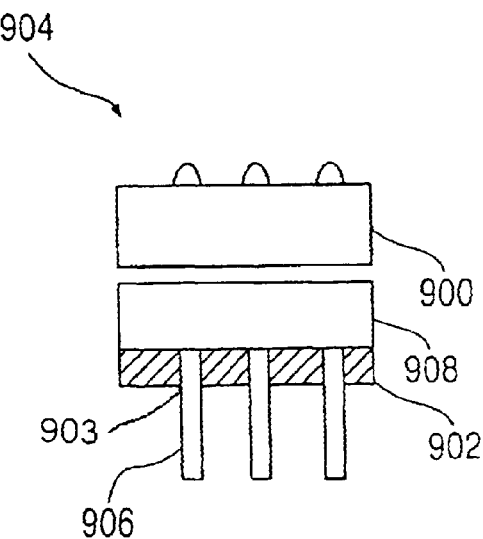
FIG. 9B is a cross-section of another embodiment of the present invention.

Another alternative to v-grooves is shown in FIGS. 9A and 9B. As shown therein, a polymer film 902 is provided on the optics block 900 having the optical elements 904 thereon. The polymer film 902 may be a single layer or a plurality of layers. The polymer film 902 includes a plurality of holes 903 which align the fibers 906 to the optics block 900. The holes 903 may be formed lithographically in the polymer layer using the same alignment marks as used in creating the optics on the optics block 900. This reduces the requirements on the support structure for the fibers 906, since these fibers are now aligned by the holes in the polymer film. The fibers may be tapered to further facilitate the alignment in the holes and the loose alignment in the support. FIG. 9B illustrates another alternative of the configuration in FIG. 9A in which there are two substrates, 900, 908, each which may have optical elements thereon. The substrates may be bonded together. Any of the previous configurations may include the use of a plurality of substrates bonded together, and optical elements may be provided on either side of the substrate(s).

While all of the example of two-dimensional arrays used fibers with flat endfaces, no spacers, and circular optical elements alone, any of the arrays discussed in connection with the one-dimensional arrays could be employed in any of the two-dimensional configurations. Further, when forming a two-dimensional array, a plurality of one-dimensional arrays could be used for both the optical elements and the fibers, e.g., by integrating array 600 with array 708. Additionally,.while the configurations show the fibers in V-grooves or holes, any structure for providing precise positioning of the fibers may be used. Anti-reflection coatings may be provided wherever needed. Finally, either active and/or passive alignment, either visual and/or mechanical, may be used with any of the configurations.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. A system comprising:

a two-dimensional array of optical fibers arranged in a structure providing precise positioning of the optical fibers; and a two-dimensional array of lithographically created, non-rod shaped optical elements, each optical element corresponding to an optical fiber, said array of non-rod shaped elements being integral with said array of optical fibers, wherein one of said array of optical fibers and said array of non-rod shaped elements is a deconstructed two-dimensional array and another of said array of optical fibers and said array of non-rod shaped elements is an integrated two-dimensional array.

2. The system of claim 1, wherein said array of non-rod shaped optical elements is a unitary element.

3. The system of claim 1, further comprising a spacer between said array of non-rod shaped elements and said array of optical fibers.

4. The system of claim 3, wherein said spacer is hollow in regions through which light is to pass between said array of non-rod shaped elements and said array of optical fibers.

5. The system of claim 3, wherein said spacer is transparent to wavelength of interest through which light is to pass between said array of non-rod shaped elements and said array of optical fibers.

6. The system of claim 1, wherein said structure comprises a plurality of V-grooves, each V-groove receiving a corresponding optical fiber.

7. The system of claim 6, further comprising alignment features on a substrate supporting said array of non-rod shaped optical elements, said alignment features to be aligned with corresponding V-grooves of said array of optical fibers.

8. The system of claim 6, wherein said array of optical fibers is an integrated two-dimensional array in said structure having a plurality of V-grooves.

9. The system of claim 1, further comprising alignment marks positioned in at least one peripheral non-rod shaped optical element of said array of non-rod shaped optical elements.

10. The system of claim 1, wherein said structure is a lithographically formed plurality of holes into which said array of optical fibers are inserted.

11. The system of claim 10, wherein said lithographically formed plurality of holes is in a polymer film deposited on a surface of a substrate.

12. The system of claim 2, wherein said unitary element includes a plurality of substrates bonded together.

13. The system of claim 1, wherein said array of optical elements includes lithographically created alignment features.

14. The system of claim 13, wherein lithographically created alignment features include at least one of visual fiducial marks and mechanical mating structures.

15. The system of claim 1, further comprising alignment marks positioned in at least one peripheral non-rod shaped optical element of said array of non-rod shaped optical elements.

16. The system of claim 1, wherein a cross-section of said non-rod shaped elements is matched to a cross-section of endfaces of said optical fibers.

* * * * *